Patented Oct. 15, 1940

2,218,457

UNITED STATES PATENT OFFICE 2,218,457

DEHYDROGENATION OF ALCOHOLS

Charles F. Winans, Fairlawn, Ohio, assignor to Wingfoot Corporation, Wilmington, Del., a corporation of Delaware No Drawing. Application November 6, 1937, Serial No. 173,267

9 Claims. (Cl. 260—586)

This invention relates to a method of preparing carbonyl compounds. More particularly, it relates to the preparation of aldehydes and ketones by the dehydrogenation of primary and secondary alcohols.

It has been previously known that aldehydes and ketones could be produced by passing a primary or secondary alcohol over a suitable catalyst at a proper temperature. For example, a primary alcohol having the formula R—CH$_2$OH will yield an aldehyde having the formula R—CHO while a secondary alcohol having the formula

will yield a ketone having the formula

The prior methods of accomplishing these results, however, are usually attended by one or more disadvantages. In some of them there is a marked tendency for the compounds to become rehydrogenated. In others, perhaps due to the potency of the catalyst, when the method is applied to such saturated ring alcohols such as cyclohexanol, there is a marked tendency toward reduction of the ring so as to produce by-products containing unsaturated rings, cyclohexanol yielding phenol. In accordance with the present invention, a method of accomplishing the dehydrogenation of alcohols has been discovered by which the dehydrogenation may be easily and efficiently effected to give a high conversion of the alcohol to the carbonyl compound with a reduced tendency to rehydrogenation and without the attendant production of by-products when applied to saturated ring alcohols such as cyclohexanol.

According to the practice of the invention, the primary or secondary alcohol is passed over a catalyst comprising intimately associated oxides of copper and chromium as its principal constituents in the presence of steam. Copper oxide-chromium oxide catalysts are well known and have been variously applied both to hydrogenation and dehydrogenation processes. The present invention, however, enables the use of these catalysts in dehydrogenation processes in a much more efficient manner than heretofore. Any of the copper oxide-chromium oxide catalysts and modified varieties of such catalysts, such as those known to the art, may be employed. Various methods of preparation and modifications of these catalysts are described by Adkins et al. in J. A. C. S. 55, 2292 (1933), and Connor et al., J. A. C. S. 54, 1145 (1932).

According to one method of preparing these catalysts a solution of two mols of copper nitrate in water is added to a solution of one mol of ammonium dichromate in dilute ammonium hydroxide. The precipitate formed is filtered to remove as much water as possible and the cake is dried at a temperature of 80 to 125° C. The cake is then powdered or broken into small pieces and heated, preferably in small portions, in a container over an open flame, stirring during the heating. When the decomposition is well started the heat is removed. Decomposition proceeds until there is a suddent evolution of gas and the mass becomes black. The mix is stirred and cooled. It is then leached with 10% acetic acid, filtered, washed with water and dried. It may then be further pulverized. If the catalyst cake has been reduced only to the size of small lumps or granules, it may be used directly but if it has been pulverized it will be desirable, in order to facilitate the passage of the vapor through the catalyst mass, to lump the catalyst by means of a suitable binding agent. Such binding agents include sodium silicate, the alkali metal carbonates such as sodium and potassium carbonate, and others. Of these the alkali metal carbonates are particularly advantageous. When the catalyst contains an alkali metal carbonate such as sodium carbonate, it is more resistant to catalyst poisons and is more readily reactivated than when the catalyst does not contain such material. It is also advantageous at times to modify the catalyst by associating with the oxides of copper and chromium the oxides of one or more metals such as barium, magnesium, calcium, strontium, zinc, etc., in a manner well known to the art. These additional metal oxides are ordinarily added in relatively small amount, as, for example, 5% to 10% by weight in the final catalyst.

Following are specific examples of the preparation of such catalysts.

Example A

To a solution of 522 grams of copper nitrate and 62.6 grams of barium nitrate in water was added a solution of 302 grams of ammonium dichromate in 400 ml. of aqua ammonia. The brick-red precipitate which formed was separated, thoroughly washed with water, and dried at 110° C. This material was then heated in a casserole over a free flame. At about 200° C. a vigorous reaction started, oxygen being evolved, and the mass became black and powdery. It was washed well with 10% acetic acid followed by water, moistened with a sodium carbonate solution, and baked at 150° C. The rather hard cake formed was broken into granules.

Example B

A solution of 566 grams of ammonium carbonate in 3 liters of water was added to a solution of 32 grams of barium nitrate, 462 grams of chromium nitrate, and 600 grams of copper nitrate in 4 liters of water. The green precipitate formed was separated, washed thoroughly with water, and dried at 110° C. When the cake was heated at 200° C. for one hour, its color changed to dark brown and it broke into small granules suitable for use.

According to the invention, the alcohol together with steam is passed over a catalyst of the type just described, the reaction being carried out in the vapor phase and at a temperature of 180°–400° C. The vaporization of the alcohol and admixture of the steam may be accomplished by any desired means. Best results are obtained by having substantial amounts of steam in the mixture. Good results are usually obtained by having one to ten volumes of steam to one of the alcohol although quantities either higher or lower than these may also be used. One very efficient method of accomplishing both the vaporization of the alcohol and the addition of the steam is to steam distill the alcohol into the catalyst chamber.

The following examples will serve to illustrate the practice and advantages of the invention.

Example 1

A copper-chromium-barium oxide catalyst prepared according to Example A was packed into an electrically heated reaction tube. The tube was heated to about 325° C. and 351 grams of cyclohaxanol were steam distilled through the system over a period of 4 hours. The evolution of hydrogen was theoretical. The product, when separated and distilled, yielded 330 grams of cyclohexanone boiling at 150–156° C. The refractive index of 1.4511 indicated a high degree of purity. The yield was 94% of the theoretical.

Example 2

The catalyst from Example 1, without intervening purification, was used for the conversion of 1160 grams of cyclohexanol in the same manner as described above. The product obtained was combined with that from Example 1 to give a total of 1398 grams of cyclohexanone which was 93% pure by direct assay. This represented a yield of 94.1% of the theoretical.

Example 3

The catalyst used in Examples 1 and 2 was reactivated by heating it in the tube to 450° C. and blowing air through it. In this way the carbonaceous deposit from the decomposition of a small part of the cyclohexanol was burned out and any reduced portions of the metal oxides were reoxidized to the oxide state. Fifty grams of mixed dimethyl cyclohexanols were steam distilled through the tube. The evolution of hydrogen was nearly theoretical. The 42 grams of ketone product boiling at 168–178° C. represented about 84% of the theoretical yield.

Example 4

A copper-chromium-barium oxide catalyst prepared according to Example B was used for the treatment of 400 grams of cyclohexanol, which were steam distilled through the catalyst at 325° C. over a period of 4 hours. The evolution of hydrogen was approximately theoretical. The product weighed 363 grams, boiled at 150–156° C. and had a refractive index of 1.4507. The yield was 92.6% of theoretical.

More cyclohexanol was passed through the system until a total of 2190 grams of cyclohexanol had been converted to 1976 grams of cyclohexanone which had a refractive infex of 1.4508 and a cyclohexanone content of 97.9% by direct assay. This represented a yield of 92.3% of the theoretical. It was found desirable in this run to reactivate the catalyst after passing through approximately each 800 grams of cyclohexanol by heating the catalyst to about 450° C. in a stream of air.

Example 5

A catalyst prepared according to Example A was used for the treatment of 2-methyl cyclohexanol. Four hundred fifty grams of 2-methyl cyclohexanol were steam distilled over the catalyst at a temperature of 325° C. over a period of 4½ hours. The product weighed 431 grams, boiled at 155–161° C. and had a refractive index of 1.4494. This represented a yield of 97.5% of theoretical. A total of 2250 grams of 2-methyl cyclohexanol was steam distilled through the reaction tube, a reactivation of the catalyst being required after each 450 grams. The total product obtained weighed 2060 grams and contained over 98% 2-methyl cyclohexanone by direct assay. This represented a yield of 94% of the theoretical.

Example 6

The spent catalyst recovered from Examples 1 and 5 were heated at 500° C. in a muffle furnace to drive off carbonaceous material and to reoxidize the reduced portions. The mass was then powdered and soaked with 15% sodium carbonate solution. The excess liquor was drained off and the moist paste allowed to dry for 24 hours in air at room temperature. The dried cake was reduced to small lumps and charged into the reaction tube. Five hundred twenty-five grams of cyclohexanol were steam distilled through the converter at 315° C. during 5 hours. The product was separated and gave 498 grams of cyclohexanone boiling at 150–156° C. and with a refractive index of 1.4507. This represented a yield of 97% of the theoretical.

Benzyl alcohol, capryl alcohol and the butyl ether of ethylene glycol when treated in a manner similar to the above examples were converted to the corresponding aldehydes with the same high degree of efficiency.

While as previously stated, the reaction can be carried out at 180–400° C., the preferred range within which best results are obtained is 250–350° C. The temperatures required seem to depend primarily on the alsoholic group which is being dehydrogenated so that the temperature ranges listed are more or less independent of the substituents on this group so that the process and its temperature conditions apply quite generally to all primary and secondary alcohols. It must be remembered, however, that in this process, as in other hydrogenation and dehydrogenation processes, the catalyst is subject to poisoning so that the materials employed should be free of catalyst poisons such as sulfur, chlorine, etc., or the activity of the catalyst will be so reduced that the efficiency of the process will be greatly lowered.

Any other primary or secondary alcohol may be used in the process to yield the corresponding carbonyl derivatives, the primary alcohols giving aldehydes and the secondary alcohols giving ketones. Further representative examples of the alcohols are methyl, ethyl, propyl, n-butyl, n-amyl, isopropyl and secondary butyl alcohols, the secondary amyl alcohols, and other higher homologues, such as caproic, oenanthylic, and caprylic alcohols. Also included are the unsaturated alcohols such as vinyl, allyl, crotonyl, etc. alcohols. Also included are the poly hydroxy alcohols such as the glycols and glycerol. Also included are the aromatic alcohols, such as benzyl alcohol, phenyl ethyl alcohol, furfuryl alcohol, phenyl propanol, phenyl propenol, phenyl glycol, salicyclic alcohol, etc. Also included are the cyclo alcohols, such as cyclohexanol, ortho and para methyl cycohexanol, para tertiary butyl cyclohexanol, para amyl cyclohexanol, various dimethyl cyclohexanols, etc., and various substituted alcohols including such compounds as the butyl ether of ethylene glycol.

It will be apparent from the foregoing examples and description that by the practice of the invention aldehydes and ketones may be produced by the dehydrogenation of the corresponding primary and secondary alcohols with great ease and a high degree of efficiency and conversion with a notable freedom from side reactions and by-products.

Although only the preferred embodiments of the invention have been described in detail it will be apparent to those skilled in the art that various modifications may be made therein without departing from the spirit of the invention or the scope of the appended claims in which it is intended to cover by suitable expression all of patentable novelty residing in the invention.

What I claim is:

1. The method of dehydrogenating primary and secondary alcohols which comprises passing the alcohol together with steam over a catalyst consisting essentially of intimately associated copper oxide and chromium oxide, the reaction being conducted at a temperature of 180–400° C.

2. The method of preparing a ketone which comprises passing the corresponding secondary alcohol together with steam over a dehydrogenation catalyst consisting essentially of intimately associated copper oxide and chromium oxide, the reaction being conducted at a temperature of 180–400° C.

3. The method of preparing an aldehyde which comprises passing the corresponding primary alcohol together with steam over a dehydrogenation catalyst consisting essentially of intimately associated copper oxide and chromium oxide, the reaction being conducted at a temperature of 180–400° C.

4. The method of dehydrogenating primary and secondary alcohols which comprises passing the alcohol together with steam over a catalyst consisting essentially of intimately associated oxides of copper and chromium but also containing a minor proportion of barium oxide, the reaction being conducted at a temperature of 180–400° C.

5. A method of making cyclohexanone which comprises passing cyclohexanol together with steam over a dehydrogenation catalyst consisting essentially of intimately associated oxides of copper and chromium at a temperature of 180–400° C.

6. The method of making cyclohexanone which comprises steam distilling cyclohexanol over a dehydrogenation catalyst consisting essentially of intimately associated oxides of copper and chromium at a temperature of 180–400° C.

7. The method of making cyclohexanone which comprises steam distilling cyclohexanol over a dehydrogenation catalyst consisting essentially of intimately associated oxides of copper and chromium but also containing a minor proportion of barium oxide at a temperature of 180–400° C.

8. The method of making cyclohexanone which comprises steam distilling cyclohexanol over a dehydrogenation catalyst consisting essentially of intimately associated oxides of copper and chromium at a temperature of 250–350° C.

9. The method of dehydrogenating primary and secondary alcohols which comprises passing the alcohol together with steam, at a temperature of 180–400° C., over a catalyst consisting essentially of intimately associated oxides of copper and chromium but also containing a minor proportion of an alkali metal carbonate.

CHARLES F. WINANS.